(12) United States Patent
Nuebling

(10) Patent No.: US 7,845,557 B2
(45) Date of Patent: Dec. 7, 2010

(54) IDENTIFICATION DEVICE

(75) Inventor: Ralf Ulrich Nuebling, Denzlingen (DE)

(73) Assignee: Sick AG, Waldkirch (DE)

( * ) Notice: Subject to any disclaimer, the term of this patent is extended or adjusted under 35 U.S.C. 154(b) by 0 days.

(21) Appl. No.: 12/385,791

(22) Filed: Apr. 20, 2009

(65) Prior Publication Data
US 2009/0261168 A1 Oct. 22, 2009

(30) Foreign Application Priority Data
Apr. 22, 2008 (EP) .................. 08103656

(51) Int. Cl.
G06K 7/10 (2006.01)
G06K 7/14 (2006.01)
(52) U.S. Cl. .................. 235/454; 235/435; 235/462.01
(58) Field of Classification Search .................. 235/435, 235/454, 462.01–462.49
See application file for complete search history.

(56) References Cited
U.S. PATENT DOCUMENTS
2001/0017319 A1* 8/2001 Runge .................. 235/462.32
2006/0196943 A1* 9/2006 Nuebling .................. 235/462.23

FOREIGN PATENT DOCUMENTS
DE 199 50 060 A1 5/2001
EP 0 801 315 B1 10/1997
EP 1 698 995 B1 6/2006

* cited by examiner

Primary Examiner—Michael G Lee
Assistant Examiner—Laura Gudorf
(74) Attorney, Agent, or Firm—The Nath Law Group; Jerald L. Meyer; Robert T. Burns

(57) ABSTRACT

The invention relates to an identification device, in particular for the linear detection of a code arranged in an object plane. In this respect, an optical receiving system is present in the identification device with which the object plane is imaged on a spatially resolving light receiver. The optical receiving system is movably journaled with a link journaled in a swivel joint along a path of an arc of a circle for the focusing of differently far away object planes on the light receiver. To change the spacing between the optical receiving system and the light receiver, i.e. to change the focus, the position of the link and thus the optical receiving system is changed by a positioning element. In this respect, the pivot is oriented in parallel for the linear detection of the code so that a displacement of the detection region caused by the circular movement of the optical receiving system on the object plane only takes place in the direction of the linear detection of the code.

7 Claims, 2 Drawing Sheets

IDENTIFICATION DEVICE

Figure 1:
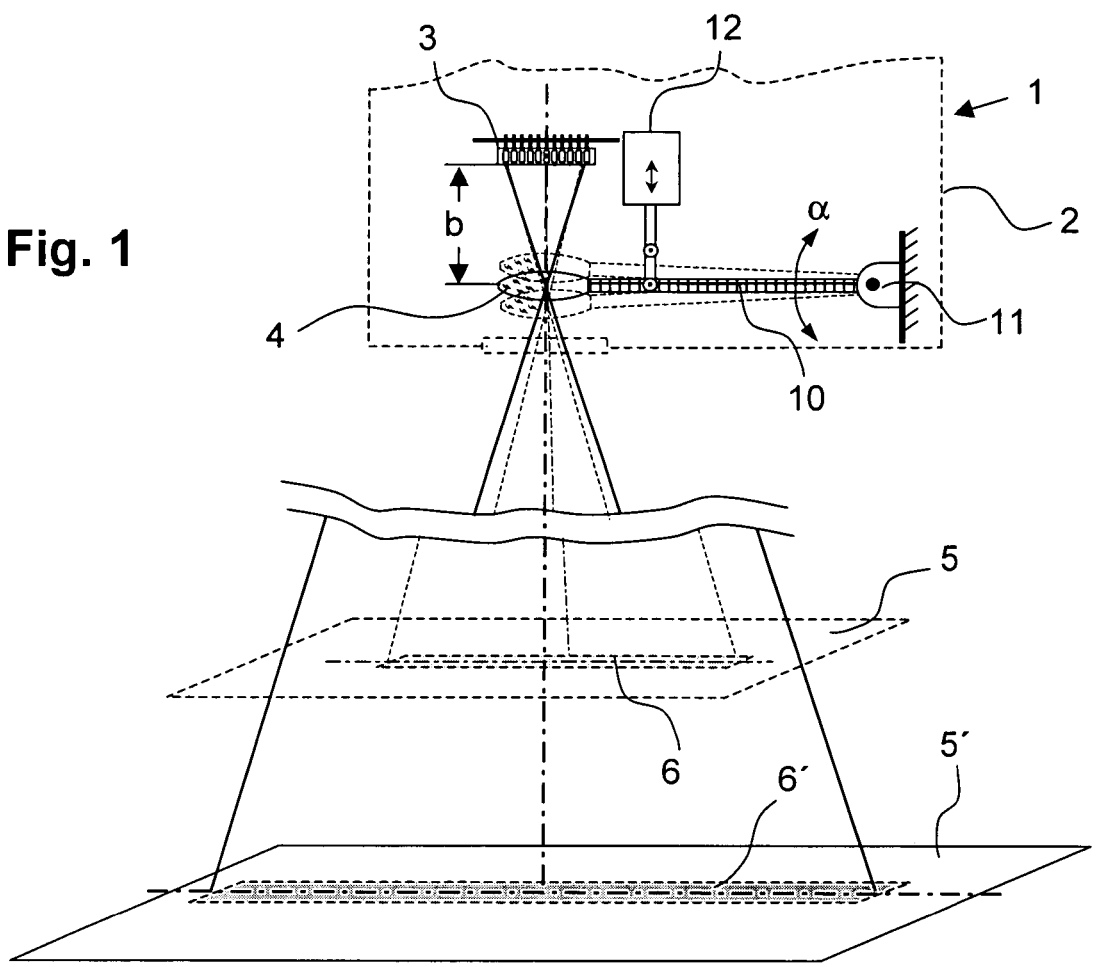

The invention relates to an identification device, in particular for the linear detection of a code arranged in an object plane.

With the identification devices known from the prior art, an image of a code present in the object plane is generated in an image plane via an optical receiving system. A spatially resolving light receiver is located in this image plane, with a plurality of light receiver pixels being arranged in linear or matrix form in said light receiver.

The different contrasts present in the code and consequently also in the image of the code generate different photocurrents in the individual light receiver pixels from which the code content can then be identified via signal processing.

Such encodings are used in a variety of application fields; thus, for example, for the identification and control of individual objects in conveying technology. In this respect, the code is not restricted to a specific type of code, but rather includes all variants of information carriers which can be recognized using an image processing device.

It is expected of powerful identification devices that ever larger quantities of information can be read on code areas which are as small as possible. This means that a high spatial resolution is demanded of the identification device. High demands are in particular made on the identification device when the code is additionally located within a large depth range. A further demand on powerful identification devices comprises the high reading quality which likewise makes an exact imaging necessary. These two conditions, i.e. large depth range and simultaneously exact imaging, require that the identification device frequently has to be equipped with a focus adjustment device.

In this respect, the focus adjustment is carried out in dependence on the respective object, for example by a manual setting, if the identification device only has to be set to a specific object distance once on the putting into operation. If, however, a focus adjustment has to be changed frequently and at short notice, it is necessary to use an identification device in which this focus adjustment is carried out by an automatic focusing process. Identification devices are therefore also known in which the focus adjustment is completely integrated into the identification device.

In addition to the question when a focus adjustment is necessary, a plurality of solutions are also known for the carrying out of this focus adjustment. For example, the total optical receiving system installed in a tube is thus moved in the direction of the optical axis with the help of a servo-motor in a guide. Solutions for the focus adjustment are also known in which the optical receiving system is positioned in a stationary manner, while the spatially resolving light receiver is arranged changeable in its distance from the optical receiving system.

With the known identification devices which are equipped with a focus adjustment, a complex and cost-intensive embodiment is often used for the carrying out of the focus adjustment. In this respect, these systems very quickly reach their limits due to the mechanical strains in the region of the journalings and guides required for this purpose. Problems in particular occur over and over again with respect to stability or reliability with a continuous and frequently required focus adjustment. Furthermore, such focus adjustments as a rule require a relatively long time and are therefore not able to react to fast changing object distances.

In the embodiments where it is not the receiver lens which is moved for the focus adjustment, but rather the spatially resolving light receiver, problems mostly occur in the region of the thermal dissipation from the light receiver. Furthermore, the strain on the movable electrical connections between the spatially resolving light receiver and a subsequent signal processing unit is usually very problematic on the movement of the light receiver for the focus adjustment.

DE 198 04 803 A1 discloses a triangulation sensor in which the receiver or transmitter lens is movable by a setting means. However, this does not serve for the focusing, but for the setting of the scanning region and nor is the triangulation sensor made for the reading of codes.

It is therefore the underlying object of the invention to provide an identification device with a simple, cost-effective focus adjustment. In this respect, the focus adjustment should be suitable both for the manual setting with a known object distance and for an integrated autofocus setting with a changing object distance.

A device in accordance with claim 1 and a method in accordance with claim 7 are provided to satisfy this object. It is therefore the underlying idea of the invention to journal the optical receiving system movably along an arc or along a path of an arc of a circle using a link journaled in a swivel joint for the focusing of differently far away object planes on the light receiver. The link is mechanically connected to a positioning element for the movement of the link around the rotary bearing so that the spacing between the optical receiving system and the light receiver can be changed continuously for the focusing. In this respect, the link is oriented in parallel for the linear detection of the code (center of rotation transverse to the receiver line) so that a displacement of the detection zone on the object plane caused by the circular or arcuate movement of the optical receiving system only takes place in the direction of the linear detection of the code and thus does not result in any serious negative influence on the imaging. To keep the tilting of the optical receiving system small, it is advantageous to select a link which is as long as possible or to make it as elongated as possible.

In accordance with the invention, the advantages of a cost-effective and compact-size focus adjustment are thus realized without moved cables. The heat coupling of the receiver element is good and the squint angle lies in the direction of the illumination line; no widening of the transmission line beyond the spacing is thus necessary and the line is only taken with some lateral offset, which has no negative effects for the reading result. The focus adjustment is extremely fast due to the low mass. An adjustment on the putting into operation is not necessary, but the focal ranges can rather already be taught in the production process.

In a special embodiment, the link comprises a double link fixed to a dual joint. The two arms of the double link are rotatably connected to a coupling member so that the double link corresponds to a parallelogram arrangement. This arrangement is also known as a four-bar linkage. Because the optical receiving system is fastened to the coupling member of the double link, the optical receiving system is not inclined on the movement on the path of the arc of a circle. In other words, the direction of the optical axis of the optical receiving system is not changed, but only its position. The anyway already small negative influence with respect to the imaging influencing by the circular movement of the optical receiving system is thereby reduced.

Provision is made in a further embodiment of the invention that a leaf spring journaling is installed as a swivel joint. Since the link usually only has to be pivoted within a small rotational angular range in the rotary bearing, a particularly clearance-free and reproducible pivoting of the link and thus of the movement of the optical receiving system is ensured by the use of a leaf spring journaling. Alternatively, sliding bearings or ball bearings can be used.

In an advantageous embodiment of the invention, a bearing block for the reception of the rotary bearing, the positioning element for the movement of the link and/or the light receiver are arranged on a common electronics card. In this respect, the bearing block and the positioning element can, beside the light receiver, for example, also be inserted via alignment pins into corresponding receiving bores in the electronics card and can be fastened to the electronics card by means of solder connections. An adjustment can thus simultaneously take place via this connection. It is conceivable only to provide some of the elements on the electronics card and, for instance, to provide the positioning element externally. A very cost-effective and compact assembly for the carrying out of a focus adjustment in the identification device is provided with the arrangement on the electronics card. At the same time, it is possible to substantially simplify the installation and adjustment effort in the preparation of this assembly by the use of the anyway present very exact electronics card production, particularly when the light receiver is a direct component of the electronics card.

If the identification device only has to be set to a changed object distance once on the putting into operation or only occasionally, for example on a conversion of the identification device to a changed object distance, provision is made that the positioning element installed in the identification device is a manually actuated setting screw or an eccentric lever. In this respect, it is alternatively possible in a further development of this idea of the invention that the manual positioning element is equipped with a defined adjustment display and/or a latch position. It is thus possible in a simple and cost-effective manner to focus the identification device onto an object plane at a known distance.

It is particularly advantageous if the positioning element is an electrically activated actuator because a change of the focusing to differently far away object planes can take place automatically. For this purpose, a motor, or a stepper motor, can be controlled both by a distance measuring device installed in the identification device or by an external set value. It is equally possible that the positioning element is a piezo element, a moving coil, a linear or circular actuator or another adjustment unit.

The method in accordance with the invention can be further developed in a similar manner and shows similar advantages. Such further developments are listed in an exemplary, but not exclusive, manner in the subordinate claims depending on the independent claims.

Provision is advantageously made in the method to adjust the link in that it is held by means of a bearing block which is attached together with the spatially resolving light receiver on an electronics card. The adjustment and installation then preferably take place by fastening or soldering in the correct adjustment position, for instance by solder pins arranged correspondingly in the electronics card manufacture or later. In this manner, processes of the electronics card manufacture whose precision is controlled relatively well can replace the later adjustment or at least substantially facilitate it.

Figure 2:
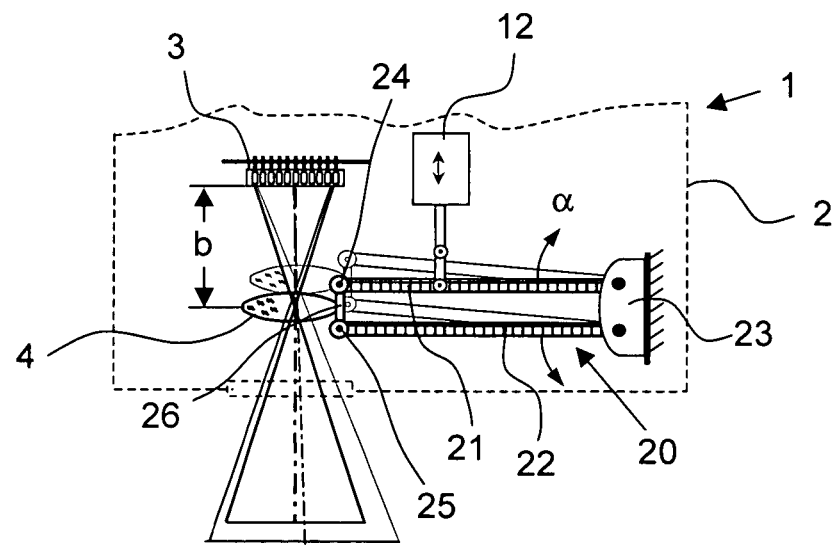
Figure 3:
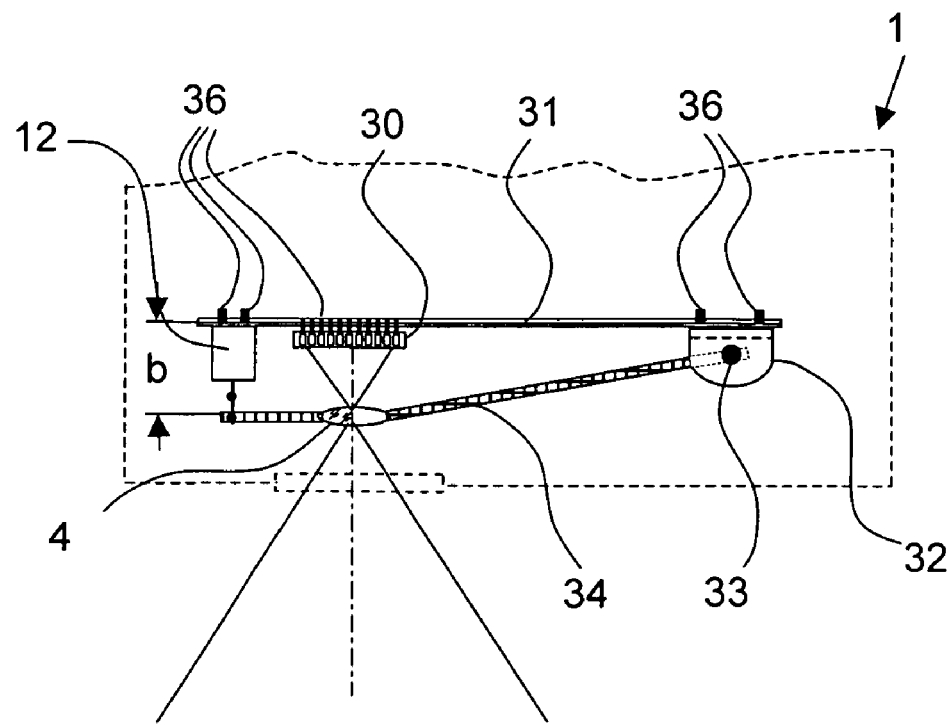
Figure 4:
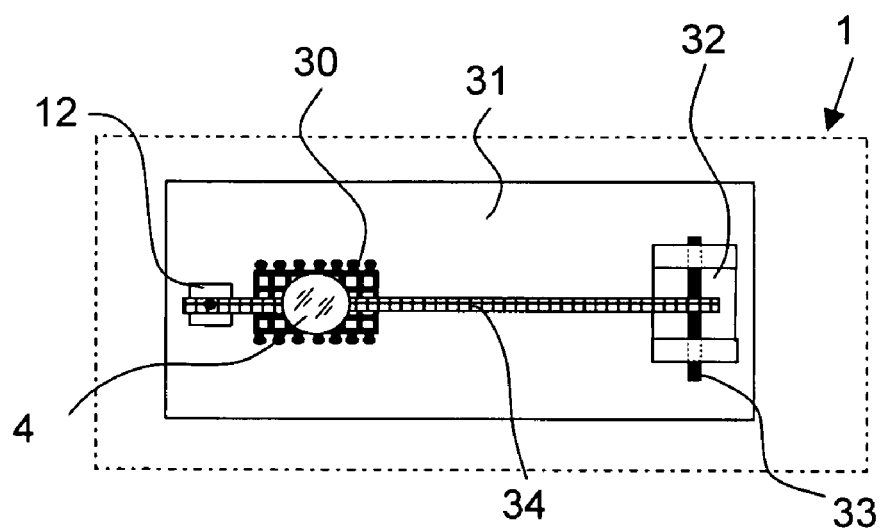

The invention will be explained in the following by way of example with reference to FIGS. 1 to 4. There are shown in the drawing:

FIG. 1 in a schematic representation, a lateral sectional view of an identification device with an optical receiving system attached to a link;

FIG. 2 in a schematic representation, a lateral sectional view of an identification device with an optical receiving system attached to a double link;

FIG. 3 in a schematic representation, a side view of a focus adjustment device attached to an electronics card;

FIG. 4 in a schematic representation, a plan view of a focus adjustment device attached to an electronics card.

An identification device in the form of a code reader 1 is shown sectionally by way of example in FIG. 1. The code reader 1 has a spatially resolving light receiver 3 in a housing 2. This spatially resolving light receiver 3 can, as shown in FIG. 1, be made for the detection of a one-dimensional code. In this case, the spatially resolving light receiver 3 is, for example, a CCD array or a CMOS array. On the use of the code reader for the detection of two-dimensional information, the spatially resolving light receiver 3 is then, for example, a CCD matrix or a CMOS matrix. A preferred application is the conveying of the code information to be read past the code reader 1, for instance as a stationary code reader for parcels in a logistics center or for the sorting of baggage at airports where the image information is read in line-wise or section-wise and is put together to a total image.

An optical receiving system 4 is furthermore installed in the housing 2 and an image of an object plane 5, 5' is generated with it on the spatially resolving light receiver 3. The optical receiving system 4 is shown symbolically only by a single lens for better understanding. It is, however, equally possible that the optical receiving system 4 is a receiver lens which is composed of a plurality of mutually connected and/or spatially separate optical components. Since the spatially resolving light receiver 3 is a receiver array in the code reader 1 shown in FIG. 1, only a linear zone 6, 6' is also detected by the object plane 5, 5'. This means that a code present in the object plane 5, 5' is likewise detected in a linear manner.

For this reason, the object plane 5, 5' also only has to be illuminated in the region of the linear zone 6, 6'. Depending on the condition of use and on the respective task of the code reader, the linear zone 6, 6' is additionally illuminated by an illumination device not shown in FIG. 1. This illumination device, which can be equipped with one or more light sources, is either integrated in the code reader 1 or is arranged as a separate external illumination unit beside the code reader 1.

The optical receiving system 4 is attached to an end of a link 10 in the representation in FIG. 1. The link 10 is fastened to a swivel joint 11 at the oppositely disposed end. In this manner, the link 10 can be pivoted in both directions along an angle $\alpha$ by the swivel joint 11. A spacing b between the optical receiving system 4 and the spatially resolving light receiver 3, and thus also the focusing, changes with this movement of the link 10. In accordance with optical imaging laws, an object plane 5, 5' very far away from the code reader 1 is imaged in focus on the light receiver 3, for example, when the spacing b is approximately as large as the focal length of the optical receiving system 4. If, in contrast, the spacing b becomes continuously larger than the focal length of the optical receiving system 4, the object plane 5, 5' imaged in focus on the light receiver 3 will move continuously closer toward the code reader 1.

A positioning element 12 is likewise present in the code reader 1 and is connected in force transmitting or shape matched manner to the link 10. It is thus possible to pivot the link 10 around the swivel joint 11, i.e. to change the angular position of the link 10 and thus the spacing b from the optical receiving system 4 to the light receiver 3. This positioning element 12 can in the simplest case be a manually actuated setting screw or an eccentric part, for example. It is, however, also possible, that the positioning element 12 is an electrically activated actuator. Such electrically activated actuators are, for example, one or more piezo elements a moving coil or a linear or circular actuator to name just a few embodiments. Differing from the representation, the point of engagement of the link 10 does not have to be the end disposed opposite the optical receiving system 4, but rather almost any desired arrangements of the fixed support point can be imagined.

The link 10 shown in FIG. 1 is made in the form of a double link 20 in FIG. 2. In this respect, the double link 20 comprises the two equally long pivot arms 21 and 22 which are each fixed at one side in a double joint 23. The two pivot arms 21, 22 are connected to a coupling member 26 via two rotary bearings 24 and 25 at the side of the double link 20 remote from the double joint 23. The two pivot points in the double joint 23 and the rotary bearings 24 and 25 in the coupling member 26 are equally far apart from one another so that the total double link 20 forms a parallelogram arrangement. On a movement of the double link 20 along the angle α, it is achieved with this parallelogram arrangement that the optical receiving system 4 arranged at the coupling member 26 is only displaced in parallel on a change of the spacing b. In this respect, an inclination of the optical axis of the optical receiving system 4 does not take place on the use of this double link 20, in contrast to the embodiment shown in FIG. 1. Possible aberrations caused by the inclination of the optical receiving system 4 are thus also precluded.

Further embodiments of the link 10, 20 are conceivable, in particular a Watt mechanism or a quadrant mechanism.

A particularly advantageous embodiment of the invention is shown schematically in FIG. 3. In this side view, a section of a code reader 1 is shown in which a two-dimensional spatially resolving light receiver 30 is installed. With this light receiver 30, the code reader 1 is able to detect two or more reading lines simultaneously from a code arranged in the object plane. As can be seen from FIG. 3, the spatially resolving light receiver 30 is placed on an electronics card 31 and is in this respect naturally also electrically contacted with this electronics card 31.

A bearing block 32 for the reception of a rotary bearing 33 and the positioning element 12 are furthermore attached to the electronics card 31. A link 34 is also movably journaled in the rotary bearing 33 here and the optical receiving system 4 is attached to it. The positioning element 12 likewise attached to the electronics card 31 can thus also change the spacing b between the optical receiving system 4 and the light receiver 30 here. The light receiver 30, the bearing block 32 and the positioning element 12 are likewise installed, i.e. soldered, in the electronics card 31 in an exact position by a plurality of solder pins 36. In this way, the electronics card 31 becomes a very compact and cost-effective assembly in which all the components required for the focus adjustment are arranged in an exact geometrical association.

FIG. 4 shows a plan view of the embodiment of the invention shown in FIG. 3. In this respect, in particular the two-dimensional spatially resolving light receiver 30 can be seen on the electronics card 31. The bearing block 32 with the rotary bearing 33 can equally be recognized in a schematic representation. The indication should not remain unmentioned in the explanation of this embodiment of the invention shown in FIGS. 3 and 4 that it is also likewise possible here, as described in detail in FIG. 2, to replace the link 34 by a double link 20. The advantage which can be achieved by the parallel displacement of the optical receiving system 4 can thus also be utilized in this very cost-effective ad compact embodiment.

Instead of the optical receiving system 4, it is also possible to consider arranging the light receiver 3 movably with a link in order alternatively to set the correct focal position via pivoting movements of the light receiver 3 instead of the optical receiving system 4.

REFERENCE NUMERAL LIST

1 code reader
2 housing
3 light receiver
4 optical receiving system
5, 5' object plane
6, 6' linear zone
10 link
11 swivel joint
12 positioning element
20 double link
21 pivot arm
22 pivot arm
23 double joint
24 rotary bearing
25 rotary bearing
26 coupling member
30 two-dimensional light receiver
31 electronics card
32 bearing block
33 rotary bearing
34 link
36 soldering pins
α angle
b spacing

The invention claimed is:

1. A stationary code reader for linear detection of a code arranged in an object plane, comprising:
    a code reader configured to read image information linewise and form the image information into a total image;
    an optical receiving system provided in the code reader;
    a spatially resolving light receiver adjusted for imaging the object plane;
    a common electronics card attached to a bearing block and the spatially resolving light receiver; and
    a moveable link journaled in a swivel joint and connecting with the bearing block and a positioning element; wherein:
    the spatially resolving light receiver moves along an arc for focusing the object plane on the spatially resolving light receiver, and
    the moveable link is oriented in parallel for a linear detection of the code so that a displacement of a detection zone on the object plane only takes place in a direction of the linear detection of the code.

2. The stationary code reader of claim 1, wherein
    the moveable link is a double link fixed at a double joint in a parallelogram arrangement,
    with the optical receiving system attached to a coupling member connecting the two pivot arms of the double link.

3. The stationary code reader of claim 1, wherein
    the moveable link changes the spacing between the optical receiving system and the light receiver and is fixed in a plate spring journaling at a side remote from the optical receiving system.

4. The stationary code reader of claim 1, wherein the positioning element attaches to a second moveable link and the common electronics card.

5. The stationary code reader of claim 1, wherein the positioning element is selected from the group consisting of a manually actuated setting screw and an eccentric lever; and the setting screw or eccentric lever is equipped with a defined setting display and/or a latch position.

6. The stationary code reader of claim 1, wherein the positioning element is an electrically activatable actuator.

7. A method for linear detection of codes arranged in an object plane, comprising:

configuring a code reader to read image information linewise and form the image information into a total image;

providing an optical receiving system in the code reader;

adjusting a spatially resolving light receiver for imaging the object plane;

attaching a common electronics card to a bearing block and the spatially resolving light receiver;

connecting a moveable link journaled in a swivel with the bearing block and a positioning element;

moving the spatially resolving light receiver along an arc for focusing the object plane on the spatially resolving light receiver, and orienting the moveable link in parallel for linear detection of the code so that a displacement of a detection zone on the object plane only takes place in a direction of the linear detection of the code.

\* \* \* \* \*